(12) United States Patent
Groninga et al.

(10) Patent No.: US 11,117,655 B2
(45) Date of Patent: Sep. 14, 2021

(54) COUNTER-ROTATING TAIL ROTOR

(71) Applicant: Bell Textron Inc., Fort Worth, TX (US)

(72) Inventors: Kirk L. Groninga, Keller, TX (US);
Daniel B. Robertson, Southlake, TX (US)

(73) Assignee: Bell Textron Inc., Fort Worth, TX (US)

( * ) Notice: Subject to any disclaimer, the term of this patent is extended or adjusted under 35 U.S.C. 154(b) by 165 days.

(21) Appl. No.: 16/436,406

(22) Filed: Jun. 10, 2019

(65) Prior Publication Data
US 2020/0385111 A1    Dec. 10, 2020

(51) Int. Cl.
*B64C 27/82* (2006.01)
*B64C 27/78* (2006.01)
*B64C 27/52* (2006.01)

(52) U.S. Cl.
CPC .............. *B64C 27/82* (2013.01); *B64C 27/52* (2013.01); *B64C 27/78* (2013.01); *B64C 2027/8254* (2013.01)

(58) Field of Classification Search
CPC ......... B64C 27/52; B64C 27/78; B64C 27/82; B64C 2027/8254; B64C 27/54; B64C 27/72
USPC ...................................................... 244/17.19
See application file for complete search history.

(56) References Cited

U.S. PATENT DOCUMENTS

| | | | | |
|---|---|---|---|---|
| 2,415,622 A | * | 2/1947 | Bossi | B64C 27/82 244/17.13 |
| 3,432,119 A | * | 3/1969 | Miller | B64C 27/82 244/6 |
| 3,506,219 A | * | 4/1970 | Mouille | B64C 27/12 244/17.21 |
| 3,977,812 A | * | 8/1976 | Hudgins | B64C 27/12 416/123 |
| 4,953,811 A | * | 9/1990 | Smith | B64C 27/82 244/17.19 |
| 5,131,603 A | * | 7/1992 | Meyers | B64C 27/82 239/265.19 |
| 5,269,654 A | * | 12/1993 | Chapman | B64C 27/82 244/17.19 |
| 2013/0032664 A1 | | 2/2013 | Kebrle et al. | |
| 2013/0134256 A1 | * | 5/2013 | Gaillard | B64C 27/82 244/17.21 |
| 2018/0208305 A1 | | 7/2018 | Lloyd et al. | |
| 2018/0354612 A1 | | 12/2018 | Hefner et al. | |
| 2019/0100302 A1 | | 4/2019 | Ulrich et al. | |

FOREIGN PATENT DOCUMENTS

EP    3290338 B1    9/2018

* cited by examiner

*Primary Examiner* — Brady W Frazier
(74) *Attorney, Agent, or Firm* — Shackelford, Bowen, McKinley & Norton, LLP

(57) ABSTRACT

An exemplary tail rotor includes a first blade assembly configured to rotate in a first direction about an axis of rotation and a second blade assembly configured to rotate in a second direction about the axis of rotation.

20 Claims, 7 Drawing Sheets

COUNTER-ROTATING TAIL ROTOR

TECHNICAL FIELD

This disclosure relates in general to the field of aircraft, and more particularly, to a rotorcraft with a counter-rotating tail rotor.

BACKGROUND

This section provides background information to facilitate a better understanding of the various aspects of the disclosure. It should be understood that the statements in this section of this document are to be read in this light, and not as admissions of prior art.

A traditional rotorcraft, such as a helicopter, includes one main rotor system to generate aerodynamic lift to support the weight of the rotorcraft in flight and thrust to counteract aerodynamic drag and move the rotorcraft in forward flight. A tail rotor system is typically included to generate thrust in the same direction as the main rotor system's rotation to counter the torque effect created by the main rotor system.

SUMMARY

An exemplary tail rotor includes a first blade assembly configured to rotate in a first direction about an axis of rotation and a second blade assembly configured to rotate in a second direction about the axis of rotation.

An exemplary aircraft includes a tail boom extending from a fuselage along a longitudinal axis, a tail rotor located on the tail boom, the tail rotor including a first blade assembly configured to rotate in a first direction about an axis of rotation and a second blade assembly configured to rotate in a second direction about the axis of rotation, wherein the axis of rotation is generally transverse to the longitudinal axis.

An exemplary method of flying an aircraft includes counter-rotating about an axis of rotation a first blade assembly and a second blade assembly of a tail rotor, the first blade assembly having a first rotor mast extending in a first direction along the axis of rotation away from a first gear member and a first hub assembly coupling first blades to the first rotor mast, and the second blade assembly having a second rotor mast extending in a second direction away from a second gear member and a second hub assembly coupling second blades to the second rotor mast. Rotational power may be supplied from a prime mover through a bevel gear to the first gear member and the second gear member. In some embodiments, a collective pitch rod extends through the first rotor mast and the second rotor mast and the collective pitch rod is coupled to the first pitch arms and the second pitch arms so that linearly moving the collective pitch rod along the axis of rotation changes the pitch of the first blades and the second blades.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
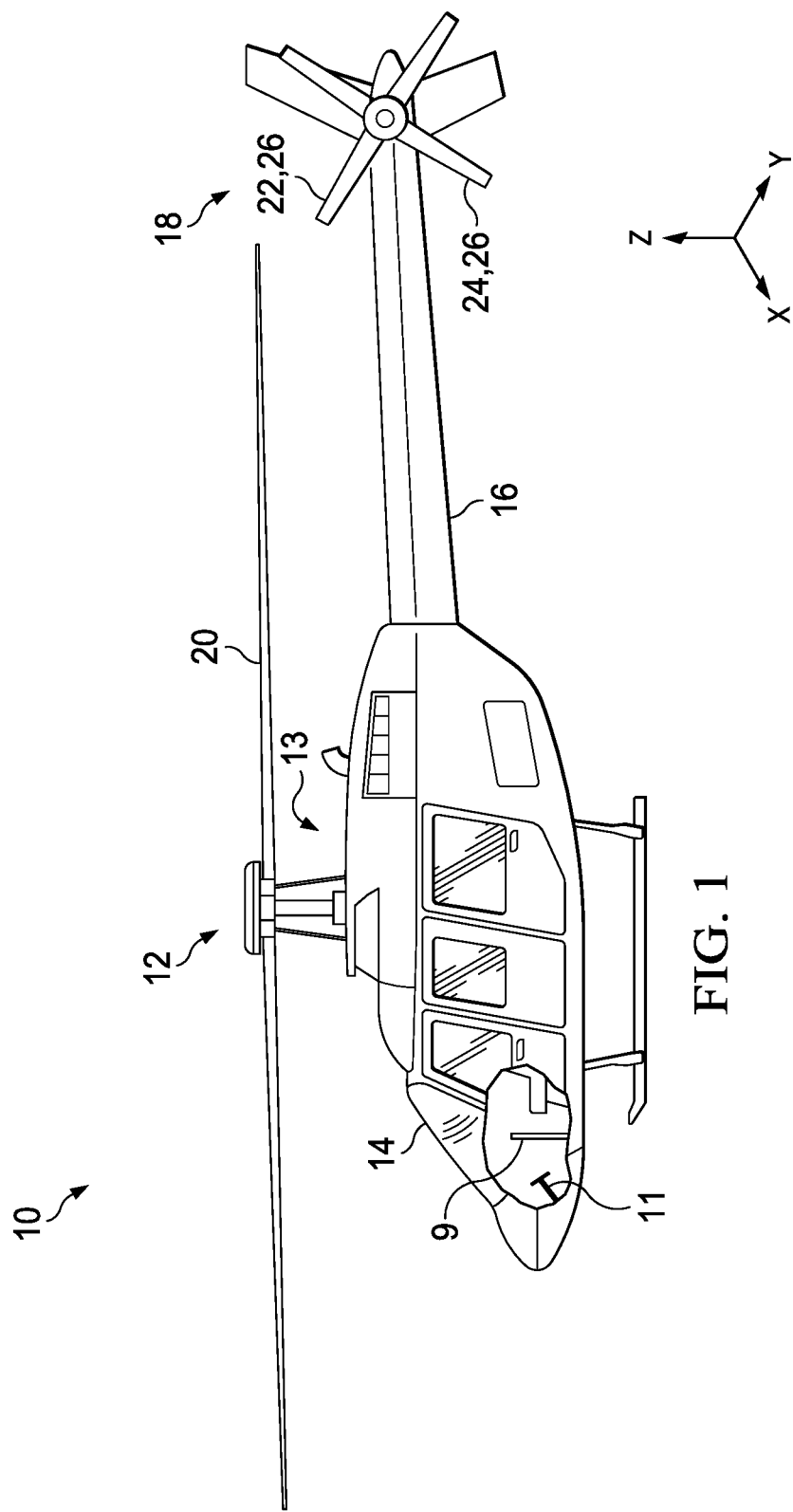
FIG. 1 illustrates an exemplary aircraft incorporating an exemplary counter-rotating tail rotor.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 2:
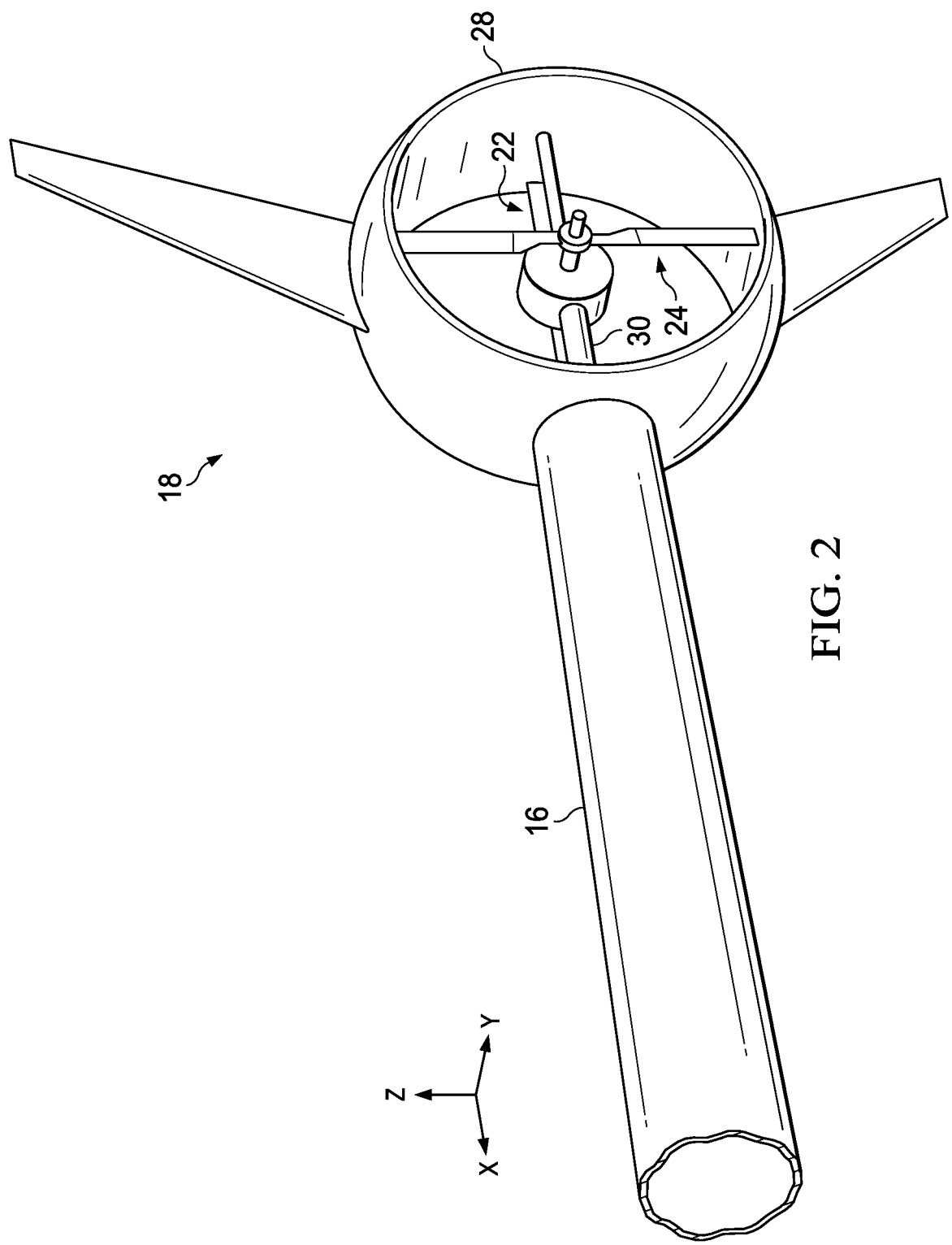
FIG. 2 illustrates an exemplary counter-rotating tail rotor.

FIGS. 1 and 2 depict three mutually orthogonal directions X, Y, and Z forming a three-dimensional frame of reference XYZ. Longitudinal axis X corresponds to the roll axis that extends through the center of aircraft 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates an exemplary vertical takeoff and landing (VTOL) rotary aircraft 10 incorporating a counter-rotating tail rotor 18. Exemplary aircraft 10 is illustrated as a helicopter. Aircraft 10 includes a rotor system 12, a fuselage 14, and a tail boom 16 carrying an anti-torque system represented by counter-rotating tail rotor 18. Rotor system 12 includes a main rotor having multiple blades 20 for creating flight. Rotor system 12 may include a control system for selectively controlling the pitch of each blade 20 to control direction, thrust, and lift of aircraft 10. Blades 20 are controlled by multiple controllers within fuselage 14. The pitch of each rotor blade 20 can be manipulated to selectively control direction, thrust, and lift of aircraft 10. For example, during flight a pilot can manipulate the cyclic controller 9 for changing the pitch angle of rotor blades 20 and/or manipulate pedals 11, thus providing vertical, horizontal, and yaw flight movement.

Counter-rotating tail rotor 18 generally provides thrust to counter the torque due to the rotation of rotor blades 20 and allows a pilot to control the yaw of aircraft 10. For example, the pitch of each rotor blade of counter-rotating tail rotor 18 can be manipulated to control direction and thrust of counter-rotating tail rotor 18. Counter-rotating tail rotor 18 includes a first blade assembly 22 and a second blade assembly 24. First and second blade assemblies 22, 24 each include blades 26. Blades 26 generally rotate about the transverse axis Y generally extend parallel to vertical axis Z and longitudinal axis X. In some embodiments, blade assemblies 22, 24 may be canted relative to the X-Y plane. First and second blade assemblies 22, 24 are driven by a prime mover 13, such as an internal combustion engine, an electric motor, and/or a hydraulic motor.

FIG. 2 illustrates another exemplary embodiment of a counter-rotating tail rotor 18. First and second blade assemblies 22, 24 are located within a shroud 28. First and second blade assemblies 22, 24 are simultaneously driven by a single drive shaft 30. Shroud 28 may eliminate or reduce the swirl component for blade assemblies 22, 24 increasing the efficiency of the tail rotor. Placing the rotor blades in shroud 28 eliminates blockage of the thrust from the tail boom 16 such as in the arrangement illustrated in FIG. 1. Shroud 28 also shields blade assemblies 22, 24 from inadvertent contact with ground personnel.

Figure 3:
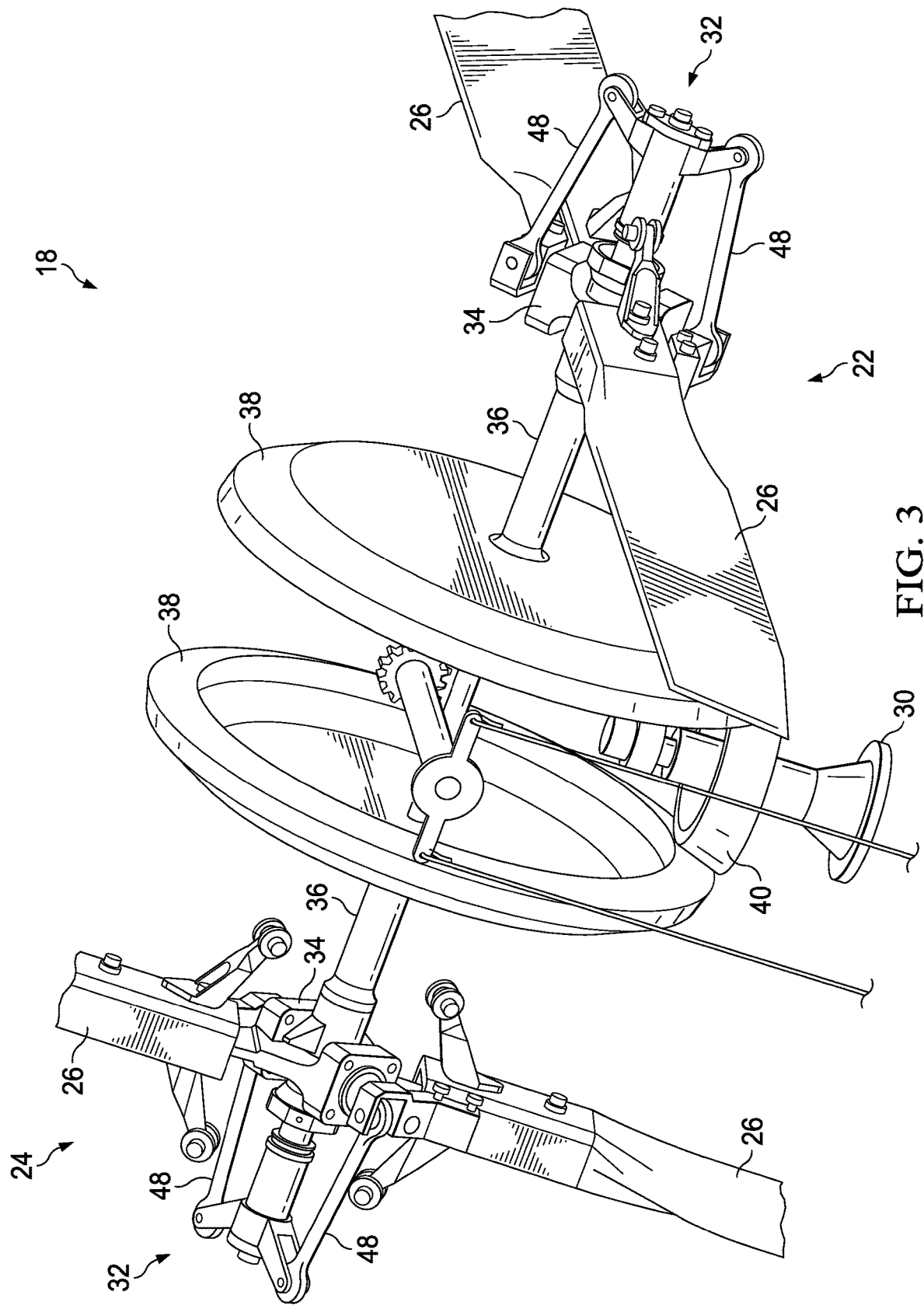
FIG. 3 illustrates another exemplary counter-rotating tail rotor.
Figure 4:
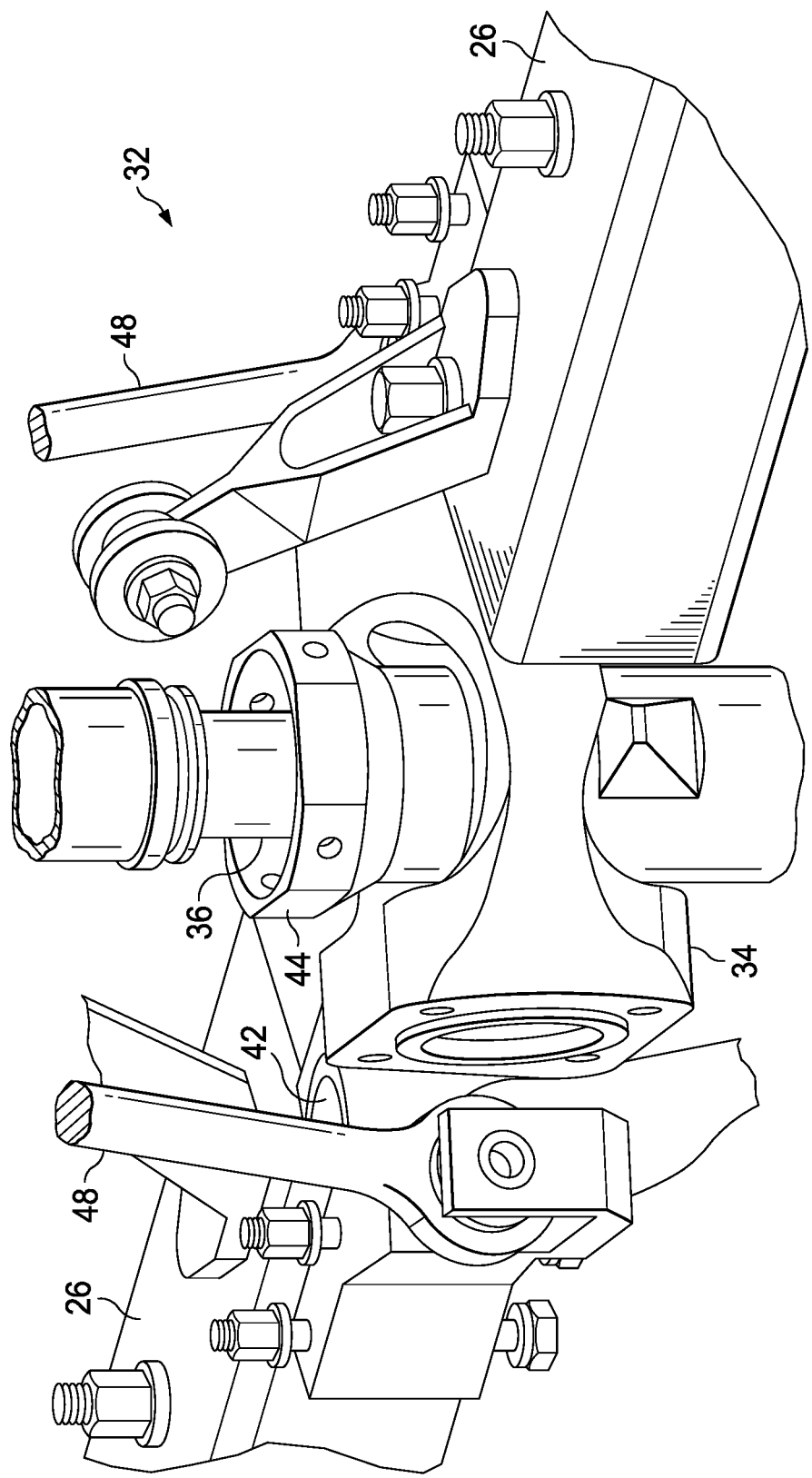
FIG. 4 illustrates an exemplary hub assembly of a counter-rotating tail rotor.
Figure 5:
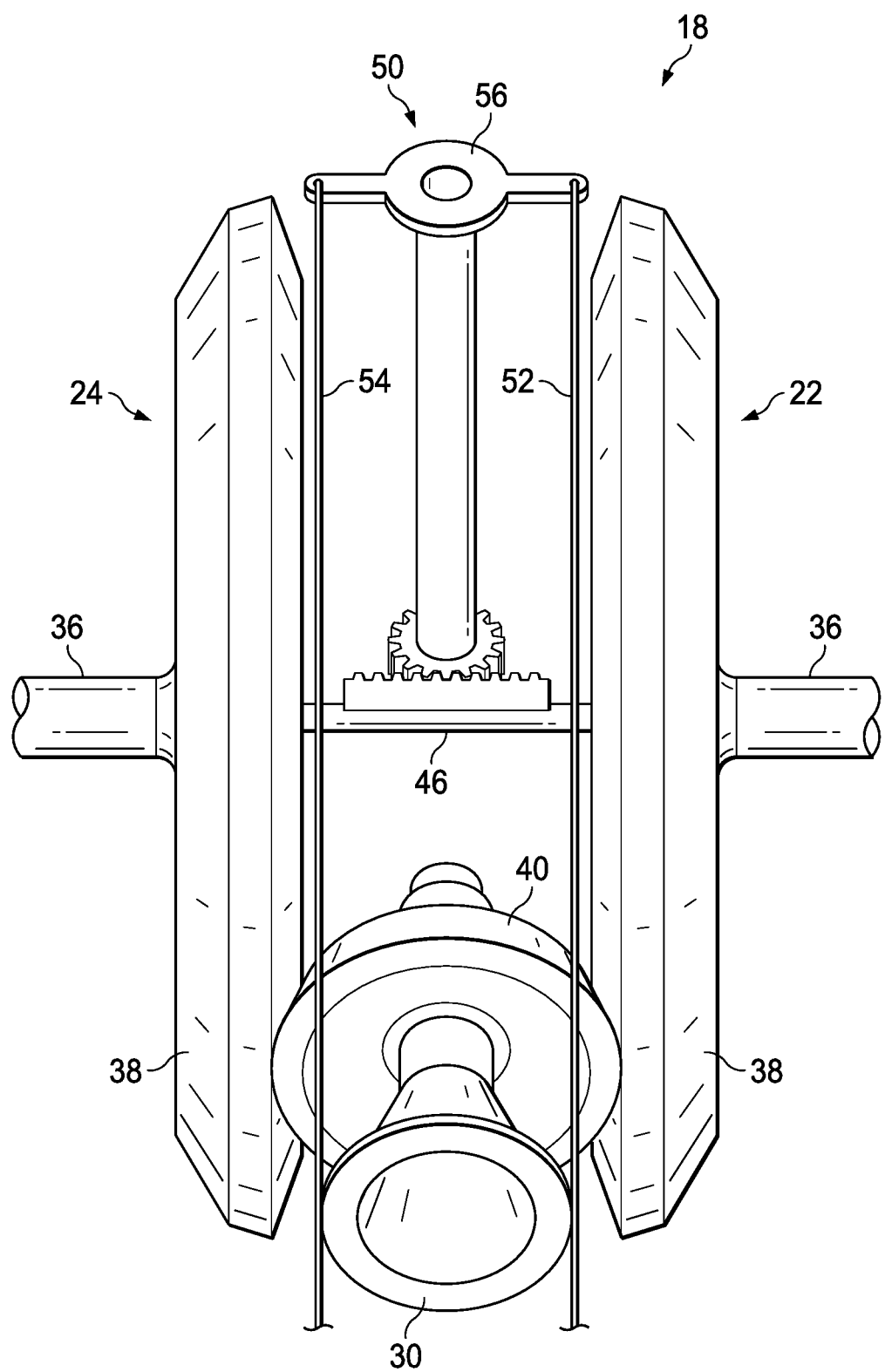
FIG. 5 illustrates a central portion of an exemplary counter-rotating tail rotor.

With reference in particular to FIGS. 3-5, blade assemblies 22, 24 are the same and described primarily with reference to blade assembly 22. Blade assemblies 22, 24 each include a hub assembly 32 including a yoke 34 rotationally coupled to a rotor mast 36. Rotor mast 36 is coupled to a gear member 38. Gear members 38 are positioned adjacent to one another with first blade assembly rotor mast 36 and second blade assembly rotor mast 36 coaxially aligned and extending in opposite directions along the same axis of rotation, e.g. transverse axis Y. Drive shaft 30 rotationally couples a prime mover 13 to gear member 38 of the respective first and second blade assemblies 22, 24 through a bevel gear 40. First blade assembly 22 and second blade assembly 24 rotate in opposite directions in response to the rotation of bevel gear 40. The pitch of blades 26 can be controlled through collective controls.

Hub assemblies 32 each include pitch bearings 42 attaching blades 26 to yoke 34 and a teetering gimbal 44 coupling yoke 34 to rotor mast 36. Each blade 26 is attached to a collective pitch rod 46 through a pitch arm 48. Collective pitch rod 46 extends through the co-axially aligned rotor masts to connect with pitch arms 48 of first blade assembly 22 and with pitch arms 48 of second blade assembly 24. Collective pitch rod 46 is a member of collective actuator 50, illustrated as a rack and pinion actuator, positioned between first blade assembly 22 and second blade assembly 24. In the illustrative example, cables 52, 54 are couple pinon 56 of rack and pinion assembly 50 to controls in the fuselage. It will be recognized by those with skill in the technology and with benefit of this disclosure that rack and pinion 50 can be replaced with other mechanisms to control the pitch of blades 26.

Figure 6:
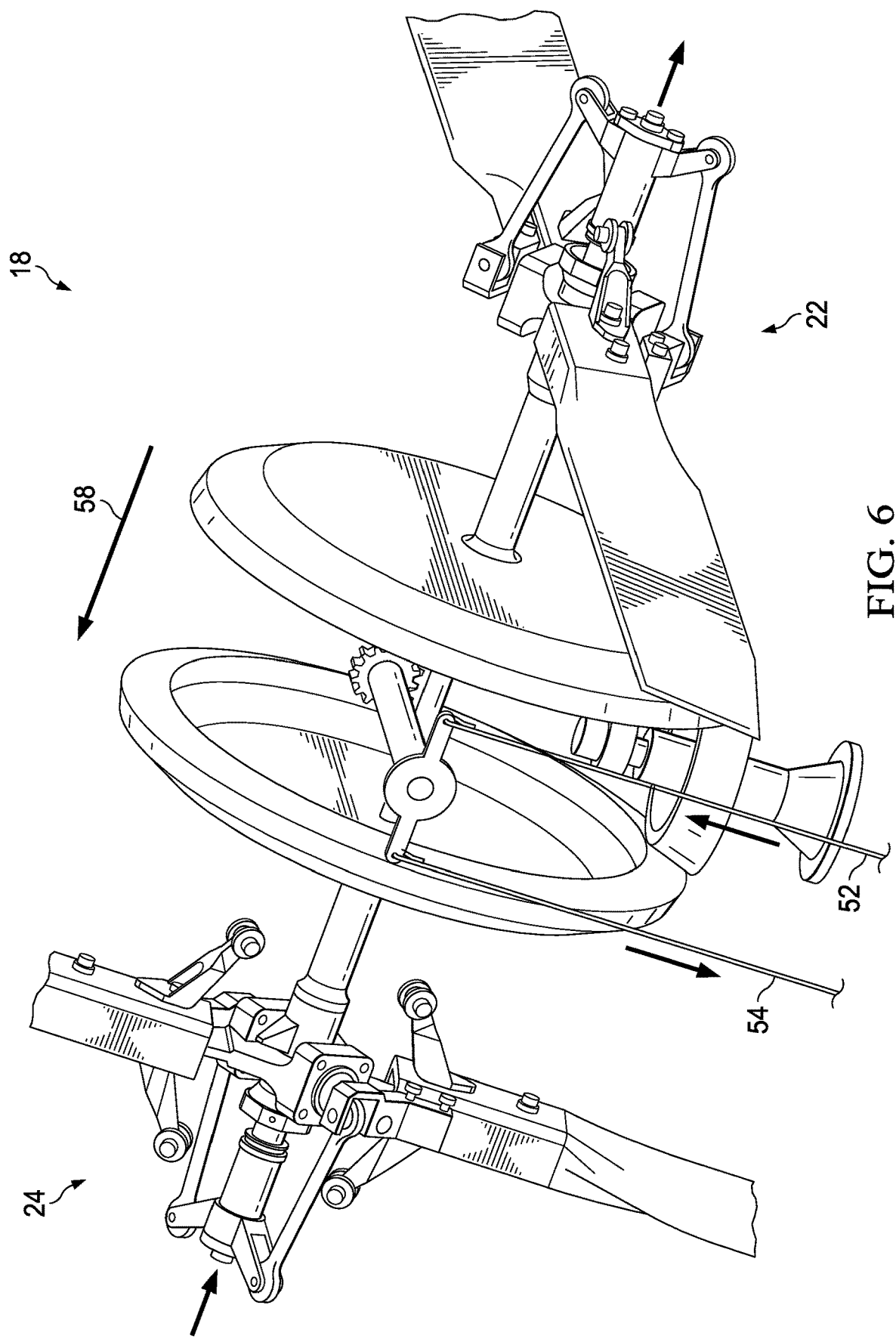
FIGS. 6 and 7 schematically illustrate operation of an exemplary counter-rotating tail rotor.
Figure 7:
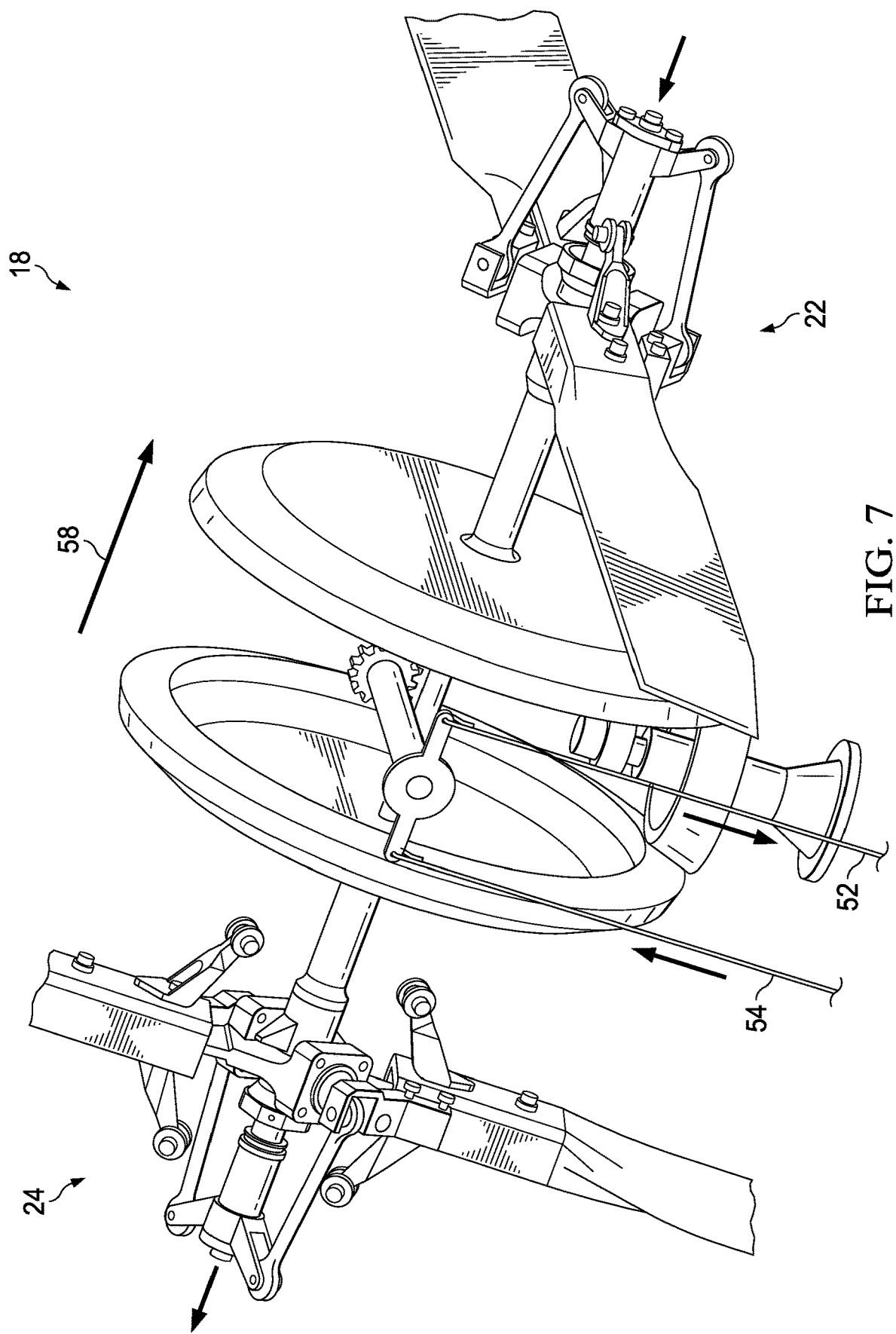

An exemplary method of operating an exemplary counter-rotating tail rotor 18 is described with reference in particular to FIGS. 6 and 7. Rotational power is provided from a prime mover through drive shaft 30 to gears 38 to rotate blades 26 of the respective first and second rotor assemblies 22, 24. In FIG. 7, application of a control signal to collective actuator 50, e.g. rack and pinion actuator, moves pitch arms 48 and changes the pitch of blades 26 of the respective blade assemblies 22, 24 such that the collective thrust 58 is in a first direction. In FIG. 7, collective thrust 58 is directed in a second direction in response to rotating pinion 56 is the opposite direction than rotated in FIG. 6.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A tail rotor comprising:
   a first blade assembly configured to rotate in a first direction about an axis of rotation, wherein the first blade assembly comprises a first rotor mast extending in a first direction away from a first gear member;
   a first hub assembly coupling first blades to the first rotor mast, the first hub assembly including first pitch arms connected to the first blades;
   a second blade assembly configured to rotate in a second direction about the axis of rotation, wherein the second blade assembly comprises a second rotor mast extending in a second direction away from a second gear member;
   a second hub assembly coupling second blades to the second rotor mast, the second hub assembly including second pitch arms connected to the second blades; and
   a collective actuator positioned between the first gear member and the second gear member, the collective actuator comprising a collective pitch rod coupled to the first pitch arms and the second pitch arms.

2. The tail rotor of claim 1, wherein the first blade assembly and the second blade assembly are positioned inside of a shroud.

3. The tail rotor of claim 1, further comprising a bevel gear positioned between the first blade assembly and the second blade assembly to rotate the first blade assembly and the second blade assembly in opposite directions around the axis of rotation.

4. The tail rotor of claim 1, wherein the collective actuator is configured to change a pitch of the first and the second blade assemblies.

5. The tail rotor of claim 4, wherein the collective actuator is positioned between the first and the second blade assemblies.

6. The tail rotor of claim 4, wherein the collective actuator is a rack and pinion actuator.

7. The tail rotor of claim 1,
   further comprising a bevel gear coupled to the first gear member and to the second gear member, the bevel gear configured to transfer rotation from a prime mover to the first blade assembly and the second blade assembly.

8. The tail rotor of claim 1, further comprising a drive shaft rotationally coupling a prime mover to the first blade assembly and the second blade assembly.

9. The tail rotor of claim 1, wherein the collective actuator is a rack and pinion actuator.

10. An aircraft comprising:
    a tail boom extending from a fuselage along a longitudinal axis;
    a tail rotor located on the tail boom, the tail rotor comprising:
       a first blade assembly configured to rotate in a first direction about an axis of rotation, wherein the first blade assembly comprises a first rotor mast extending in a first direction away from a first gear member; and
       a first hub assembly coupling first blades to the first rotor mast, the first hub assembly including first pitch arms connected to the first blades;
       a second blade assembly configured to rotate in a second direction about the axis of rotation, wherein the axis of rotation is generally transverse to the longitudinal axis, wherein the second blade assembly comprises a second rotor mast extending in a second direction away from a second gear member;
       a second hub assembly coupling second blades to the second rotor mast, the second hub assembly including second pitch arms connected to the second blades; and
       a collective actuator positioned between the first gear member and the second gear member, the collective actuator comprising a collective pitch rod coupled to the first pitch arms and the second pitch arms.

11. The aircraft of claim 10, further comprising a prime mover; and
    a drive shaft rotationally coupling the prime mover to the first blade assembly and the second blade assembly.

12. The aircraft of claim 11, wherein the prime mover is an electric motor.

13. The aircraft of claim 10, wherein the first blade assembly and the second blade assembly are located inside of a shroud.

14. The aircraft of claim 10, wherein the collective actuator is configured to change a pitch of the first and the second blade assemblies.

15. The aircraft of claim 10,
    further comprising a bevel gear coupled to the first gear member and to the second gear member, the bevel gear configured to transfer rotation from a prime mover to the first blade assembly and the second blade assembly.

16. The aircraft of claim 15, wherein the bevel gear is positioned between the first blade assembly and the second blade assembly to rotate the first blade assembly and the second blade assembly in opposite directions around the axis of rotation.

17. A method of flying an aircraft, the method comprising:
    counter-rotating about an axis of rotation a first blade assembly and a second blade assembly of a tail rotor, the first blade assembly comprising a first rotor mast extending in a first direction along the axis of rotation away from a first gear member and a first hub assembly coupling first blades to the first rotor mast, and the second blade assembly comprising a second rotor mast extending in a second direction away from a second gear member and a second hub assembly coupling second blades to the second rotor mast;
    wherein first pitch arms are connected to the first blades;
    wherein second pitch arms are connected to the second blades;
    wherein a collective pitch rod extends through the first rotor mast and the second rotor mast and is coupled to the first pitch arms and the second pitch arms;
    supplying rotational power from a prime mover through a bevel gear to the first gear member and the second gear member; and
    linearly moving the collective pitch rod along the axis of rotation.

18. The method of claim 17, further comprising simultaneously changing a pitch of the first blades and the second blades in response to operating a single collective actuator.

19. The method of claim 18, wherein the single collective actuator is a rack and pinion actuator.

20. The method of claim 17, further comprising
    changing the pitch of the first blades and the second blades in response to linearly moving the collective pitch rod.

* * * * *